Aug. 8, 1933.　　　　J. G. STEELE　　　　1,921,893
PROPELLING DEVICE
Filed Oct. 24, 1930　　　　3 Sheets-Sheet 1

Inventor
JOHN G. STEELE
By
C. L. Parker Jr.
Attorney

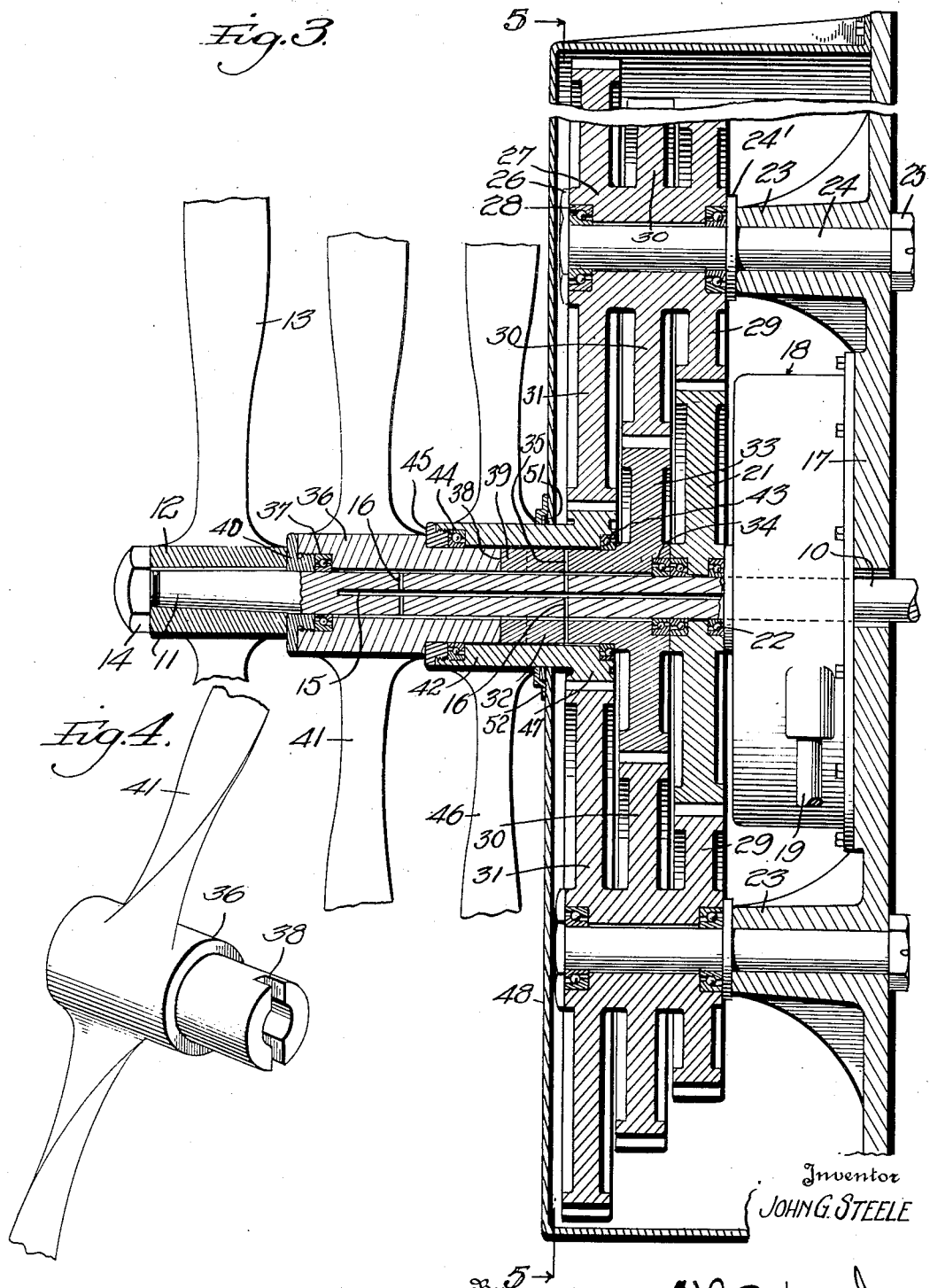

Aug. 8, 1933.  J. G. STEELE  1,921,893
PROPELLING DEVICE
Filed Oct. 24, 1930  3 Sheets-Sheet 3

Inventor
JOHN G. STEELE
By
C. L. Parker Jr.
Attorney

Patented Aug. 3, 1933

1,921,893

UNITED STATES PATENT OFFICE 1,921,893

PROPELLING DEVICE

John G. Steele, Latrobe, Pa.

Application October 24, 1930. Serial No. 491,029

10 Claims. (Cl. 170—165)

This invention relates to propelling devices, and more particularly to propelling means for aircraft.

It is the common practice to mount a single propeller on the forward end of the crank shaft of an aircraft engine, whereby the propeller revolves at engine speeds. When starting the aircraft, the motor is permitted to turn over relatively slowly for a substantial length of time to permit the motor to "warm up" as is well known, whereupon the craft is ready to "take-off" from the ground. High engine speeds are necessary to overcome the inertia of the vehicle and other resisting forces before the craft rises from the ground.

After the craft is in the air, lower engine speeds may be employed for cruising, but the engine speeds still are relatively high. Airplane engines are subjected to great destructive strains largely due to engine speeds, and this is particularly, though not wholly, due to the high engine speeds necessary when "taking off." Accordingly government regulations require that airplane engines be dismantled at regular intervals for inspection and overhauling.

An important object of the present invention is to provide propelling means for aircraft which is adapted to permit the latter to "take-off" from the ground and cruise at lower engine speeds than heretofore has been possible, thus materially reducing engine wear and lengthening the life of the engine.

A further object is to provide propelling means which is adapted to generate greatly increased propelling forces from an engine of a given horsepower, with the crank shaft of the engine revolving at relatively low speeds, thus lengthening the life of the engine and effecting material economies in the consumption of fuel and lubricating oil.

A further object is to provide a device of the character referred to which permits much larger planes to be operated with single engines, thus eliminating the use of multiple motors in certain types of passenger planes now in common use.

A further object is to provide means for operating a plurality of propellers from a single source of power with the propellers rotating about a common axis whereby greatly increased propelling forces are developed.

A further object is to provide propelling means of the character just referred to wherein a plurality of propellers are rotated about a common axis, and wherein each propeller operates at a higher speed than the propeller arranged forwardly thereof to produce greatly increased propelling forces.

A further object is to provide propelling means of the character referred to which is particularly intended for use with aircraft, but which advantageously may be employed as propelling means for boats, as ventilating means for buildings, etc.

In the drawings I have shown two embodiments of the invention. In this showing,

Figure 3 is a section on line 3—3 of Figure 1,

Figure 4 is a detail perspective view of one of the propeller hubs and associated elements.

Figure 1:
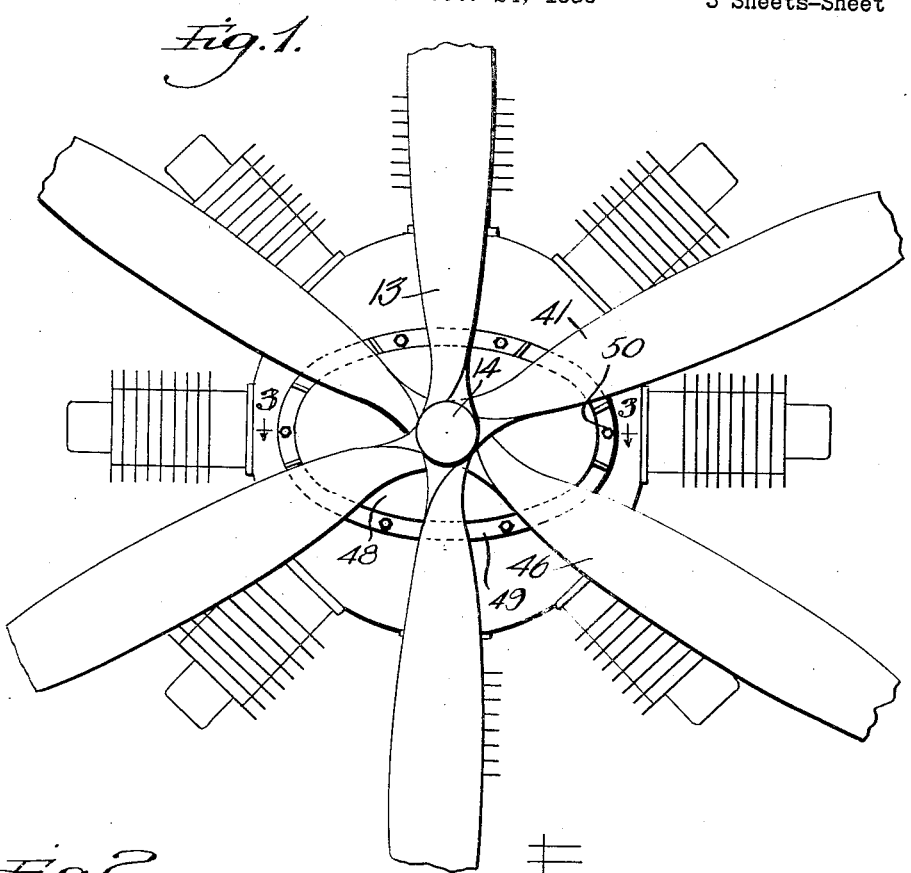
Figure 1 is a front elevation.
Figure 2:
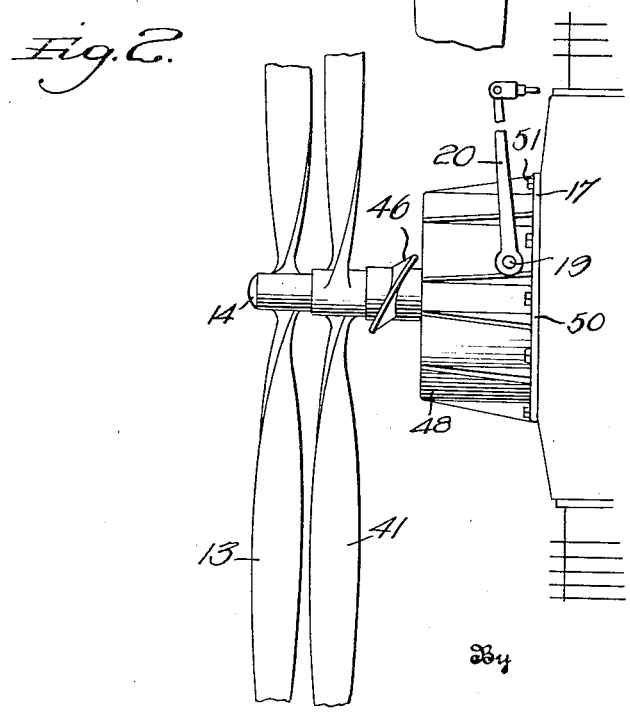
Figure 2 is a side elevation.

Referring to Figures 1 to 5 inclusive, the numeral 10 designates the propeller shaft of an airplane motor (not shown), and the propeller shaft extends forwardly of the engine a substantial distance as clearly shown in Figure 3. The forward end of the propeller shaft is preferably tapered as at 11 and carries the hub 12 of a standard propeller 13. A suitable nut 14 secures the propeller referred to in position. The crank shaft is drilled as at 15 to provide a lubricant passage which communicates at spaced points with radial passages 16 for a purpose to be described.

A heavy plate 17 is secured in any suitable manner against the front of the engine and is substantially elliptical with its main axis arranged horizontally. A clutch indicated as a whole by the numeral 18 is secured against the plate 17 substantially centrally thereof and surrounds the crank shaft 10. The crank shaft obviously extends continuously through the clutch, as indicated in Figure 3. The clutch is provided with an operating shaft 19 having a crank 20 connected to its outer end (see Figure 2).

The clutch may be of any desired type, and is preferably of the so-called multiple disk wet type, with the parts running in oil. The clutch mechanism provides means adapted to be controlled by operation of the shaft 19 for transmitting power from the crank shaft 10 to the central gear 21. This gear is rotatable about the crank shaft forwardly of the clutch and runs on bearings 22 surrounding the crank shaft as shown. The gear 21 may be of any desired type, such as spur or spiral, and is preferably of the fiber type surrounded by a steel band carrying the gear teeth. The other gear elements to be referred to preferably are of the same type.

Bosses 23 are preferably formed integral with the plate 17 on opposite sides of the crank shaft 10 and equidistantly spaced therefrom. The elements associated with and carried by the bosses 23 are identical, and only one set of these elements need be described. Each boss carries a relatively heavy stub shaft 24 projecting therethrough and secured thereto by a nut 25. A collar 24', formed integral with the stub shaft 24, seats against the outer end of the boss 23. A nut 26 is mounted on the outer end of each stub shaft 24 and retains a hub 27 in place thereon. This hub runs on bearings 28 surrounding the shaft 24. The hub 27 carries a relatively small inner gear 29 meshing with the gear 21 to be driven thereby. The hub 27 also carries a somewhat larger intermediate gear 30, and a still larger outer gear 31, and it will be apparent that the gears 29, 30 and 31 are preferably integral with the collar 27.

A collar or hub 32 surrounds the crank shaft 10 outwardly of the gear 21 and is provided at its inner end with a gear 33 meshing with the two oppositely disposed intermediate gears 30. The inner end of the hub 32 is mounted in a bearing 34 surrounding the crank shaft 10, and the hub 32 preferably is provided with lubricant passages 35 to receive lubricant through the innermost passages 16.

A hub 36 has its outer end mounted in a bearing 37 surrounding the crank shaft 10. Slots 38 are formed in the inner end of the hub 36 to receive fingers 39 formed integral with the collar 32. It will be obvious that this connection provides driving means between the collar 32 and hub 36. The bearing 37 is retained in position in the hub 36 by a nut 40. The nut 40 is threaded in the hub 36, and the threads are pitched opposite to the direction of rotation of the hub 36 to prevent the loosening of the nut 40. The collar 36 carries a propeller 41 which obviously rotates in a plane parallel to the propeller 13.

Figure 5:
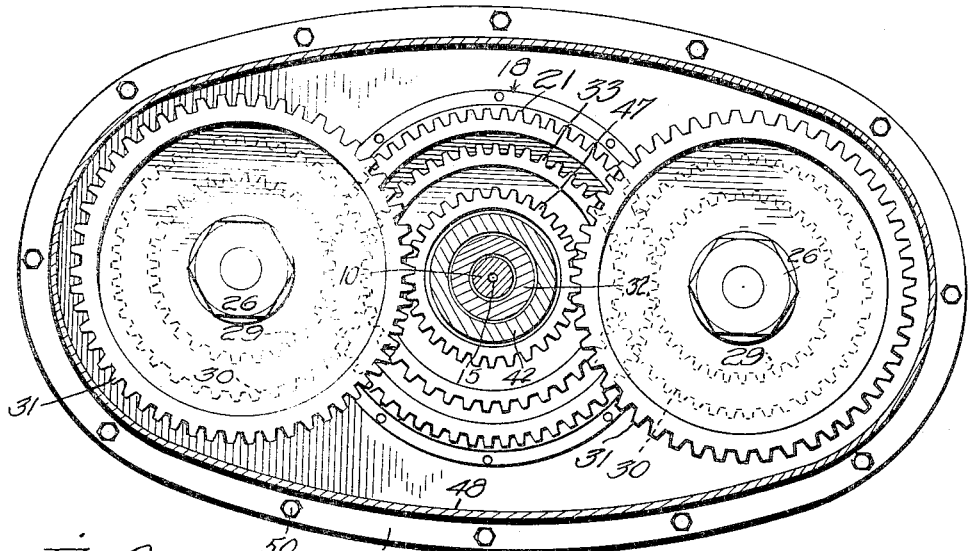
Figure 5 is a section on line 5—5 of Figure 3.

A hub 42 surrounds the collar 32 and hub 36, as shown in Figure 3, and runs on bearings 43 and 44 surrounding the collar 32 and hub 36 respectively. The bearing 44 is retained in position by a nut 45. A propeller 46 is carried by the hub 42, and this propeller obviously rotates in a plane parallel to the propellers 13 and 41. The hub 42 carries a gear 47 meshing with both of the oppositely disposed outer gears 31, as shown in Figure 3. A cover plate 48 is provided for the gearing, and this cover plate is substantially elliptical with its main axis arranged horizontally, as shown in Figure 5. The gear cover is flanged as at 49 and secured to the plate 17 by nuts 50. A felt washer 51 surrounds the hub 42 to prevent the escape of lubricant from the casing 48, and is held in position by a small plate 52, secured against the casing.

Figure 6:
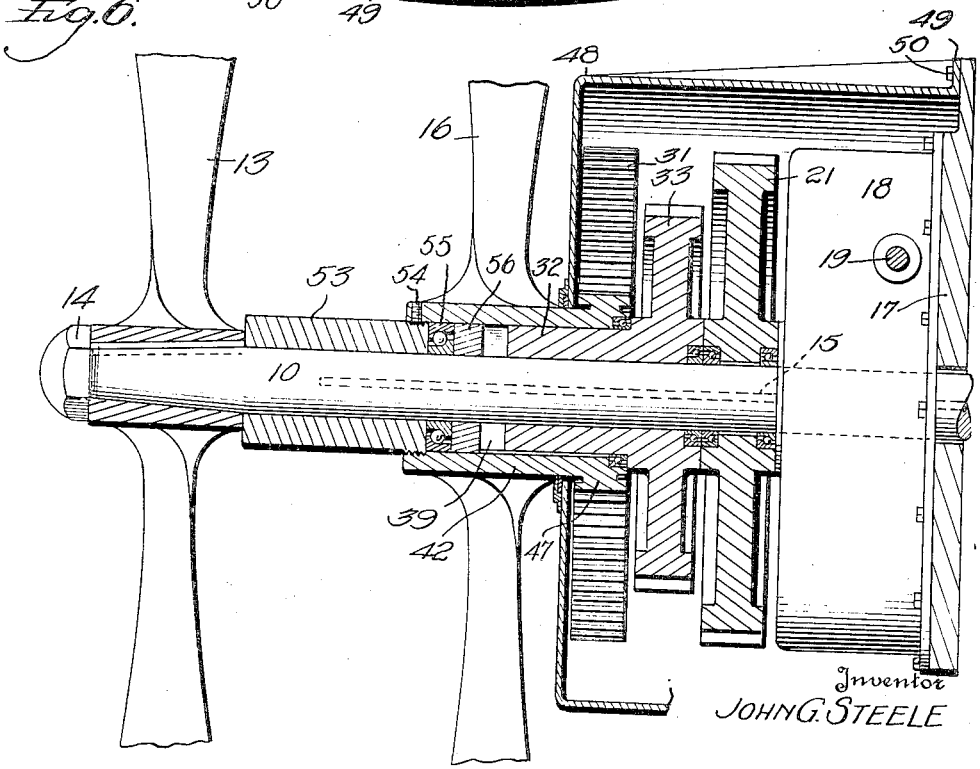
Figure 6 is a vertical sectional view through a modified form of the invention taken through the propeller shaft.

A somewhat modified form of the invention is shown in Figure 6 of the drawings. In the form of the invention previously described, three propellers are employed, but if desired, the apparatus may be employed in connection with two propellers for driving lighter airplanes. In either case, however, the same driving mechanism may be employed so that the unit will be interchangeable between planes, and in order that the manufacture of a single unit will take care of planes of different types.

Referring to Figure 6, it will be noted that the gearing is identical with the gearing previously described, and the propellers 13 and 46 are driven from the elements previously referred to. In the modified construction, however, the intermediate gear 33 runs idle, since no intermediate propeller is employed. In the modified construction, the intermediate propeller 41 and its hub 36 are removed together with the bearing 37 and nut 40. These elements readily may be removed by first removing the nut 14 and propeller hub 12. In place of the hub 36, a collar 53 is mounted on the crank shaft 10 and is threaded at its inner end for reception within the outer end of the hub 42. A set screw 54 secures the collar 53 against rotation with respect to the hub 42.

A bearing 55 is mounted in the hub 42, in view of the removal of the bearing 36, and a spacing washer 56 is arranged between the inner end of the collar 53 and the fingers 39 of the hub 32.

The operation of the device is as follows:

It will be apparent that the outermost propeller 13 will be directly driven by the crank shaft 10, and accordingly rotates whenever the motor is driven. While the motor is being warmed up prior to taking off from the ground, the clutch arm 20 is operated to release the clutch, whereby it will be apparent that the gear 21 and associated elements will not be driven. Accordingly the propellers 41 and 46 will remain stationary while the engine rotates relatively slowly, say at about 500 R. P. M., in order that the motor properly may be warmed up in accordance with the usual practice.

When the ship is ready to ascend, the clutch arm 20 will be operated to bring the elements of the clutch into engagement with each other to drive gear 21. This gear meshes with the gear 29, and since the latter gear is integral with the gears 30 and 31, these gears obviously will be driven whenever the clutch is operative. Since the gear 30 is of greater diameter than the gear 33 with which it meshes, the collar 32 obviously will be driven at an increased speed, and in practice this speed may be approximately twice the speed of rotation of the propeller 13. The collar 32 is positively connected to the hub 36 by the arrangement of the fingers 39 in the slots 38, and accordingly the propeller 41 will be driven at the same speed as the collar 32, or approximately twice the speed of the propeller 13.

The gear 31 rotates at the same speed as the gear 30, but the ratio between the gears 31 and 47 is such that the latter will be driven at a speed approximately 50 per cent greater than that of the gear 33. Accordingly, if the propeller 41 is driven at approximately 1,000 R. P. M., the propeller 46 will be driven at approximately 1,500 R. P. M., which is an average speed of rotation of aircraft propellers under present practice. The speeds of rotation referred to, however, are to be taken as merely comparative, and it will be apparent that the gear ratios may be changed as desired in order that relative speeds of rotation of the propellers may be varied.

Since the propeller 13 rotates at engine speed, it will be apparent that the greater speeds of rotation of the propellers 41 and 46 are obtained without increasing the engine speeds. The placing of great loads upon the second and third propellers is avoided, however, and accordingly the engine will not be overloaded. For example, the air into which the plane travels is first intercepted by the propeller 13 to be projected rearwardly and picked up by the propeller 41. This air is again given a somewhat increased impulse by the intermediate propeller to be forced rearwardly and then picked up by the propeller 46. This propeller rotates at a still higher speed, and thus a third and greater impulse will be imparted to the air, although the resistance to the turning movement of the propellers 41 and 46 will not be nearly so great as if these propellers were called upon to impart to still air impulses which correspond to their individual speeds of rotation. In other words, the air is subjected to progressive impulses, thus eliminating heavy loads on the engine, and a propelling force far greater than that accomplished with a single propeller is provided with the present apparatus with the engine rotating at a much lower speed.

From the foregoing, it will be apparent that propelling forces greater than the forces commonly developed can be provided from a motor of given horsepower with the motor rotating at greatly decreased speeds. It follows therefore, that a considerable saving in fuel and oil is effected, while the motor is subjected to greatly decreased strains, thus lengthening the life of the engine. Furthermore, it will be apparent that much larger planes may be driven with a motor of a given horsepower rating. The invention also permits the elimination of two of the motors commonly employed in tri-motor planes. This result is due partly to the great efficiency of the present device and is further due to the elimination of the weight of the extra motors, the weight of the structures employed for supporting such motors, and the weight of the great amount of fuel required for their consumption.

The operation of the form of the invention shown in Figure 6 is substantially the same as in the form previously described, and need not be referred to in detail. The same drive unit may be employed for the sake of standardization, while the intermediate propeller may be eliminated for use on lighter planes. The propeller 13 in the modified form of the invention operates at engine speeds, while the propeller 46 operates at the desired increased speed, and while the use of the two propellers does not generate the propelling force present when three propellers are used, the force developed will be greater than with a single propeller, and accordingly the device is highly efficient for use with the lighter types of ships.

When landing, the motor will be throttled down, in which case the first propeller, or the first and second propellers will rotate at speeds slower than the corresponding speed of the plane, in which case they operate as drags to effect a slight braking action to assist the operator in landing the ship.

As previously stated, gear ratios may be varied as may be desired, and any type of gearing may be employed. The use of the oppositely arranged sets of gears 29, 30 and 31 permits a balanced drive to be transmitted to the elements employed for driving the propellers 41 and 46, thus eliminating any lateral forces on these elements and preventing undue wear. The casing 48 may be suitably stream-lined to reduce air resistance, if desired, and this casing acts as a lubricant container whereby it will be apparent that all of the gears employed constantly run in a bath of oil to reduce wear and friction.

The device has been described particularly in its application as propelling means for aircraft, but it will be apparent that it readily may be employed with efficient results as propelling means for water craft. Similarly, a propelling unit of given power may be employed with increased efficiency when the progressive propelling means is employed for other uses, such as for the ventilation of buildings, etc.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Apparatus of the character described comprising a plurality of coaxial propellers operable in a fluid medium for causing movement thereof in one direction through said propellers, a drive shaft directly connected to one propeller, a hub connected to each of the other propellers and rotatable about the axis of said shaft, a gear connected to each hub, a manually controllable clutch connected to said shaft, and gearing connected between said clutch and each of said gears to rotate them in the same direction as said shaft, said gearing including a pair of gears arranged on opposite sides of and meshing with each of said first named gears.

2. Apparatus of the character described comprising a plurality of coaxial propellers operable in a fluid medium for causing movement thereof in one direction through said propellers, a drive shaft directly connected to one propeller, a hub connected to each of the other propellers and rotatable about the axis of said shaft, a clutch connected to said shaft, a drive gear connected to said clutch, a counter drive member arranged on each side of said shaft and including a plurality of gears one of which meshes with said drive gear, and a gear carried by each hub and meshing with one of the other gears of each of said counter drive members.

3. Apparatus of the character described comprising a plurality of coaxial propellers operable in a fluid medium for causing movement thereof in one direction through said propellers, a drive shaft connected to one propeller, a hub connected to each of the other propellers, a gear carried by each hub, a clutch connected to said shaft, a drive gear connected to said clutch, a pair of stub shafts arranged on opposite sides of said first named shaft, and a counter drive member mounted on each stub shaft and including a plurality of gears one of which meshes with said drive gear and the others of which mesh respectively with the gears of said hubs.

4. The combination with a motor shaft, of a plurality of coaxial propellers operable in a fluid medium for causing movement thereof in one direction through said propellers, one of said propellers being directly connected to the motor shaft, a hub connected to each of the other propellers and rotatable about the axis of the motor shaft, a gear operatively connected to each hub, a manually controllable clutch connected to the motor shaft, and gearing connected between said clutch and each of said gears to rotate them in the same direction as the motor shaft, said gearing including a pair of gears arranged on opposite sides and meshing with each of said first named gears.

5. The combination with a motor shaft, of a plurality of coaxial propellers operable in a fluid medium for causing movement thereof in one direction through said propellers, one of said propellers being directly connected to the motor shaft, a hub connected to each of the other propellers and rotatable about the axis of said shaft, a gear connected to each hub, a clutch connected to said shaft, a drive gear connected to said clutch, and a counter drive member arranged on each side of said shaft and including a plurality of gears one of which meshes with said drive gear and the others of which mesh respectively with the gears of said hubs.

6. The combination with a motor shaft, of a plurality of coaxial propellers operable in a fluid medium for causing movement thereof in one direction through said propellers, one of said propellers being directly connected to the motor shaft, a hub connected to each of the other propellers, a gear connected to each hub, a clutch connected to the motor shaft, a drive gear connected to said clutch, a pair of stub shafts arranged on opposite sides of the motor shaft, and a counter drive member mounted on each stub shaft and including a plurality of gears one of which meshes with said drive gear and the others of which mesh respectively with the gears of said hubs.

7. Apparatus of the character described comprising a drive shaft, a propeller connected to the end of said drive shaft, a drive gear connected to said shaft, a pair of driven gears surrounding said shaft and independently rotatable with respect thereto, a pair of counter shafts arranged on diametrically opposite sides of said drive shaft, a plurality of transmission gears secured to each other and rotatable on each counter shaft, one of the transmission gears on each counter shaft meshing with said drive gear, the remaining transmission gears on each counter shaft meshing respectively with said driven gears, and a pair of propellers arranged coaxial with said drive shaft and in planes parallel to said first named propeller, the propellers of said pair being connected respectively to said driven gears with the propeller of said pair remote from the first named propeller rotating at a higher speed than the remaining propellers.

8. Apparatus of the character described comprising a drive shaft, a propeller having a hub surrounding the end of said shaft and secured against rotation with respect thereto, detachable means engaging said hub to prevent endwise movement thereof from said shaft, a drive gear carried by said drive shaft, a pair of radially inner and outer hubs surrounding and independently rotatable with respect to said drive shaft and offset longitudinally thereof, the inner hub of said pair engaging the longitudinally inner end of said first named hub to be fixed thereby against longitudinal movement in one direction and engaging against the longitudinally outer end of the other hub of said pair to be fixed thereby against longitudinal movement in the other direction, and transmission means between said drive gear and said pair of hubs for rotating them at higher rates of speed than said first named hub and for rotating the outer hub of said pair at a higher rate of speed than the smaller hub of said pair.

9. The combination with a motor shaft, of a propeller connected to the end of said shaft, a drive gear connected to said shaft, a pair of driven gears surrounding said shaft and independently rotatable with respect thereto, a pair of counter shafts arranged on diametrically opposite sides of said motor shaft, a plurality of transmission gears secured to each other and rotatable on each counter shaft, one of the transmission gears on each counter shaft meshing with said drive gear, the remaining transmission gears on each counter shaft meshing respectively with said driven gears, and a pair of propellers arranged coaxial with said motor shaft and in planes parallel to said first named propeller, the propellers of said pair being connected respectively to said driven gears with the propeller of said pair remote from the first named propeller rotating at a higher rate of speed than the remaining propellers.

10. The combination with a motor shaft, of a propeller having a hub surrounding the end of said shaft and secured against rotation with respect thereto, detachable means engaging said hub to prevent endwise movement thereof from said shaft, a drive gear carried by said motor shaft, a pair of radially inner and outer hubs surrounding and independently rotatable with respect to said motor shaft and offset longitudinally from each other, the inner hub of said pair engaging the longitudinally inner end of said first named hub to be fixed thereby against longitudinal movement in one direction and engaging against the longitudinally outer end of the other hub of said pair to be fixed thereby against longitudinal movement in the other direction, and transmission means between said drive gear and said pair of hubs for rotating them at higher rates of speed than said first named hub and for rotating the outer hub of said pair at a higher rate of speed than the smaller hub of said pair.

JOHN G. STEELE.